(12) United States Patent
Koch

(10) Patent No.: US 11,173,404 B1
(45) Date of Patent: Nov. 16, 2021

(54) SYSTEMS AND METHODS FOR AUTOMATIC ADMINISTRATION BASED ON LEDGER-SPECIFIC POPULATIONS OF UNIQUE DIGITAL ARTICLES

(71) Applicant: Mythical, Inc., Sherman Oaks, CA (US)

(72) Inventor: Rudy Koch, Sammamish, WA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 17/225,003

(22) Filed: Apr. 7, 2021

(51) Int. Cl.
| | |
|---|---|
| A63F 13/792 | (2014.01) |
| G06Q 10/10 | (2012.01) |
| G06Q 10/08 | (2012.01) |
| G06Q 20/12 | (2012.01) |
| G06Q 20/06 | (2012.01) |
| G06F 16/27 | (2019.01) |
| A63F 13/58 | (2014.01) |
| G06Q 20/38 | (2012.01) |

(52) U.S. Cl.
CPC ............ *A63F 13/792* (2014.09); *A63F 13/58* (2014.09); *G06F 16/27* (2019.01); *G06Q 10/087* (2013.01); *G06Q 10/10* (2013.01); *G06Q 20/0655* (2013.01); *G06Q 20/1235* (2013.01); *G06Q 20/389* (2013.01); *A63F 2300/5513* (2013.01); *A63F 2300/65* (2013.01)

(58) Field of Classification Search
USPC .......................................... 463/31
See application file for complete search history.

(56) References Cited

U.S. PATENT DOCUMENTS

| | | | |
|---|---|---|---|
| 7,780,529 B2 | 8/2010 | Rowe | |
| 11,016,960 B2 * | 5/2021 | Malan | .............. G06F 16/1865 |
| 2009/0063995 A1 * | 3/2009 | Baron | .............. H04N 21/25866 |
| | | | 715/753 |
| 2013/0268357 A1 * | 10/2013 | Heath | .............. G06Q 30/02 |
| | | | 705/14.53 |
| 2019/0221076 A1 | 7/2019 | Simons | |
| 2019/0232172 A1 * | 8/2019 | Malan | .............. H04L 9/3297 |
| 2019/0299105 A1 | 10/2019 | Knight | |
| 2020/0020196 A1 | 1/2020 | Petersen | |

* cited by examiner

*Primary Examiner* — Pierre E Elisca
(74) *Attorney, Agent, or Firm* — Esplin & Associates, PC

(57) ABSTRACT

Systems and methods to automatic administration based on ledger-specific populations of unique digital articles in an online gaming platform are disclosed. Exemplary implementations may manage user accounts associated with users of an instance of a game, including a first user account having a first account inventory that includes a first unique digital article; determine a size of a set or population of unique digital articles that include the first unique digital article; determine a fraction of the set or population of unique digital articles recorded on a private decentralized ledger; determine eligibility for the first unique digital article and/or the first user to receive one or more rewards; adjust the one or more rewards based on the determined fraction; provide the adjusted rewards.

20 Claims, 5 Drawing Sheets

SYSTEMS AND METHODS FOR AUTOMATIC ADMINISTRATION BASED ON LEDGER-SPECIFIC POPULATIONS OF UNIQUE DIGITAL ARTICLES

FIELD OF THE DISCLOSURE

The present disclosure relates to systems and methods for automatic administration based on ledger-specific populations of unique digital articles and other digital assets that are not fungible.

BACKGROUND

Online gaming platforms are known. Distributed ledgers are known techniques to produce a secure record or registry of ownership of assets, transactions, and other information. For example, a distributed blockchain is a distributed ledger. Different types of distributed ledgers are known.

SUMMARY

One aspect of the present disclosure relates to a system configured to provide automatic administration based on ledger-specific populations of unique digital articles and other digital assets that are not fungible in an online gaming platform. The system may include one or more processors configured by machine-readable instructions. The one or more processors may be configured to manage user accounts associated with the users, including a first user account associated with a first user, wherein a first account inventory includes a first unique digital article. The first unique digital article is part of a set of unique digital articles that have either a common user in control, common visual characteristics as in-game user-controllable characters, or both. The one or more processors may be configured to determine a size of the set of unique digital articles. The one or more processors may be configured to determine a fraction of the set of the unique digital articles for which ownership is currently recorded on a private decentralized ledger. The one or more processors may be configured to determine eligibility for the first unique digital article and/or the first user to receive one or more rewards. The one or more processors may be configured to adjust the one or more rewards based on the determined fraction. The one or more processors may be configured to provide the adjusted rewards.

Another aspect of the present disclosure related to a method to provide automatic administration based on ledger-specific populations of unique digital articles and other digital assets that are not fungible in an online gaming platform. The method may include managing user accounts associated with the users, including a first user account associated with a first user, wherein a first account inventory includes a first unique digital article. The first unique digital article is part of a set of unique digital articles that have either a common user in control, common visual characteristics as in-game user-controllable characters, or both. The method may include determining a size of the set of unique digital articles. The method may include determining a fraction of the set of the unique digital articles for which ownership is currently recorded on a private decentralized ledger. The method may include determining eligibility for the first unique digital article and/or the first user to receive one or more rewards. The method may include adjusting the one or more rewards based on the determined fraction. The method may include providing the adjusted rewards.

As used herein, any association (or relation, or reflection, or indication, or correspondency) involving servers, processors, client computing platforms, users, user accounts, inventories, assets, populations, requests, manners of usage, exchanges, challenges, offers, transactions, in-game actions, rights, benefits, ownership, decentralized ledgers, responses, denials, contracts, metrics, metric values, scores, gains, trigger events, incentives, proposals, sets of instructions, operations, determinations, distributions, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
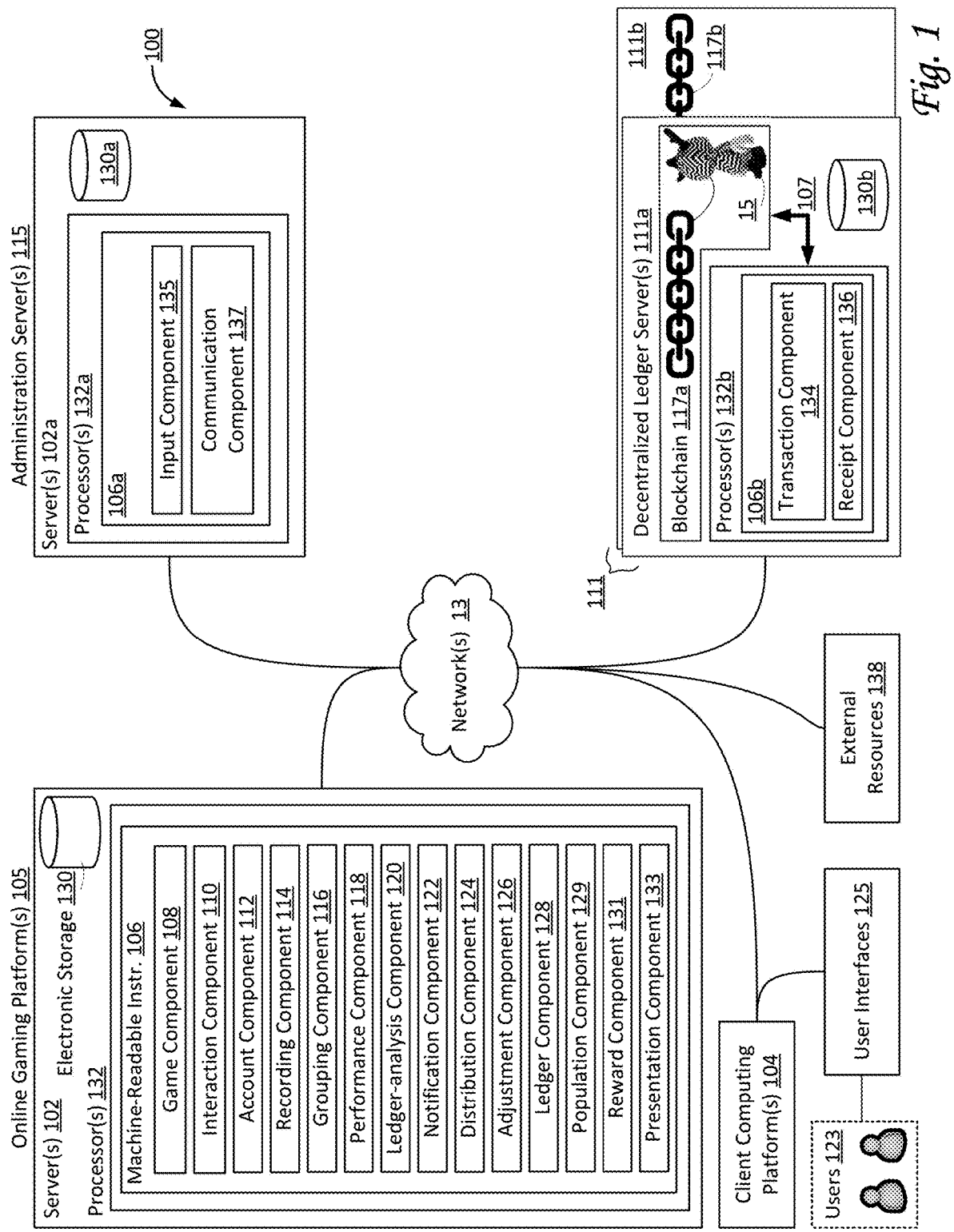
FIG. 1 illustrates a system configured to provide automatic administration based on ledger-specific populations of unique digital articles and other digital assets that are not fungible in an online gaming platform, in accordance with one or more implementations.

FIG. 1 illustrates a system 100 configured to provide automatic administration based on ledger-specific populations of unique digital articles and other digital assets that are not fungible in an online gaming platform 105, in accordance with one or more implementations. As used herein, the term "unique digital article" may refer to digital articles that are uniquely identified and/or uniquely identifiable, e.g., by an identifier or by identifying information. For example, in some implementations, an identifier or identifying information may include or be based on a combination of different types of information, including but not limited to information regarding the type of a digital article, a serial number or other numerical identifier of the digital article, and/or other types of information. As used herein, ownership of unique digital articles may be tracked, recorded, and/or otherwise registered on one or more decentralized ledgers. As such, a unique digital article may be a ledger-tracked unique digital article.

Individual unique digital articles may be associated and/or correlated with another entity (which may be referred to as a "correlated entity") by virtue of technology provided and/or supported by the one or more decentralized ledgers on which the ownership of the individual unique digital articles is tracked (including but not limited to smart contracts and/or other executable code on the one or more decentralized ledgers). Accordingly, ownership of a unique digital article may correlate to the provision of one or more rights with respect to the correlated entity (e.g., control and/or other rights). Transactions involving a unique digital article recorded on a decentralized ledger may correlate to certain transactions (or modifications) of the correlated entity, and/or vice versa.

In some implementations, correlated entities may be (or include) virtual items configured to be used within online-gaming platform 105 (such as, for example, a user-controllable in-game virtual character that is usable within an instance of a game within online gaming platform 105). Other types and/or combinations of correlated entities are envisioned within the scope of this disclosure, including but not limited to physical and/or virtual objects, items, rights, memberships, permissions, etc. The use of the singular "entity" or "correlated entity" is not intended to be limiting, as multiple different objects, items, rights, memberships, permissions, etc. may be correlated to a single unique digital article. By way of non-limiting example, a correlated entity may be an art work, a ticket to an event, a subscription to certain media content, a bundle of rights related to captured audio and/or video information, rights to distribution gains, and so forth. As used herein, the term "non-fungible token" or "NFT" may be used to refer to a combination of a particular unique digital article and a particular correlated entity that is correlated to the particular unique digital article.

As described herein, the utility or usage of a unique digital article may be different for or on different decentralized ledgers (or blockchains). The administration for a set or population of unique digital articles may be different for or on different decentralized ledgers (or blockchains), hence the term "ledger-specific". For example, the same unique digital article may have a first utility while recorded on a first decentralized ledger, but not while recorded on a second decentralized ledger. Conversely, the same unique digital article may have a second utility while recorded on the second decentralized ledger, but not while recorded on first decentralized ledger. For example, the administration of a set or population of unique digital articles may be ledger-specific, or based on how many unique digital articles are recorded of the first decentralized ledger versus the second decentralized ledger.

System 100 may include one or more online gaming platforms 105, decentralized ledger server(s) 111, administration servers 115, one or more client computing platform(s) 104, user interfaces 125, servers 102, one or more external resources 138, and/or other components. Users 123 (also referred to as players) may include one or more of a first user, a second user, a third user, a fourth user, an administrative user, and/or other users. Users 123 may include players who play and/or otherwise interact on online gaming platform 105. As used in descriptions herein, any use of the term "user" may refer to user(s) 123. Electronic storage 130a and electronic storage 130b may be similar to electronic storage 130 as described elsewhere in this disclosure, though included in administration servers 115 and decentralized ledger servers 111, respectively, as depicted in FIG. 1.

Instances of games may be executed within one or more online gaming platforms 105. As used herein, online gaming platform 105 may refer to either an individual game (e.g., an interactive online game), a type of gaming console and its ecosystem, and/or both. Online gaming platform 105 may be configured to host (and/or execute instances of) the one or more (online) games. Online gaming platform 105 may be operated, hosted, and/or owned by one or more stakeholders of online gaming platform 105. For example, a platform operator (and/or another stakeholder) may sell in-game digital assets (e.g., characters, weapons, resources, etc.) to users 123 of online gaming platform 105.

Referring to the game and to online gaming platform 105, in some implementations, individual players may own individual virtual items, and exchange these items with (or to) other individual players. As used herein, exchanges refer to individual players winning, losing, auctioning, selling, purchasing, trading, bartering, wagering, staking, and/or otherwise exchanging digital assets (directly, without a store or store interface under control of online gaming platform 105) to other individual players or with other individual players (including exchanging virtual items and/or other assets through player-to-player challenges). Due to an exchange, ownership rights of a digital asset may transition from an original owner to a new owner (even if there may, in some implementations, be one or more intermediary and/or temporary owners during the process of performing the exchange). In some implementations, digital assets may be associated with other rights than ownership rights, such as, by way of non-limiting example, distribution rights.

In some implementations, distribution rights of digital assets may reflect rights held by the individual ones of the users to receive certain distributions of benefits upon exchanges involving particular digital assets. That is, the individual users may own/hold rights to particular digital assets that guarantee them benefits upon (future) exchanges involving those digital assets regardless of whether the individual users owns/hold the ownership rights for those digital assets. In some implementations, the distribution gains may result from a particular action or activity (such as, e.g., a sale of a particular digital asset), e.g., within the online gaming platform 105, of a particular digital asset. As used herein, a distribution gain resulting from a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the users that hold the distribution rights) may receive something of value and/or use. The distribution gains may include one or more virtual currencies such as virtual tokens, virtual stars, virtual points, virtual real-world currencies (e.g., US Dollars), and/or other gains that are based on the particular digital assets.

In some implementations, the digital assets may include and/or be virtual items that are not fungible and may be usable within an online gaming platform 105. In some implementations, the digital assets may represent (three-dimensional) in-game user-controllable characters that can interact with other (in-game) virtual items within online gaming platform 105. By way of non-limiting example, digital assets may represent virtual items. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within online gaming platform 105 for which a user may use, own, sell, trade, destroy, and/or otherwise effectuate a change of ownership (including exchanging virtual items and/or other assets through challenges). As used herein, a digital asset is fungible if it is functionally and/or physically indistinguishable from another digital asset. For example, a payment token such as a Bitcoin is a fungible digital asset. A digital asset may be non-fungible if it is unique, or one-of-a-kind. For example, a specific individual Crypt® Kitty™ may be a non-fungible digital asset. A digital asset may be semi-fungible if there is a set of a limited number of similar but distinguishable digital assets. For example, a limited-edition Blanko™ or another in-game character may be a semi-fungible digital asset. For example, one of a limited number of 2-dimensional or 3-dimensional in-game virtual items may be a semi-fungible digital asset. For example, a digital ticket to a show, concert, exhibition, and/or other event may be a semi-fungible digital asset. For example, a piece of art or jewelry (e.g., as a virtual item or as representing a physical item) may be a semi-fungible digital asset. As used herein, semi-fungible digital assets are considered as "not fungible" or non-fungible digital assets. In some implementations, digital assets may be usable within one or more games.

Decentralized ledger server(s) 111 (e.g., decentralized ledger server 111a, decentralized ledger server 111b, and so forth) may be used to implement one or more decentralized ledgers, including but not limited to blockchain 117a, blockchain 117b (partially visible in FIG. 1), and so forth. In some implementations, blockchain 117a and blockchain 117b may be maintained by distributed computing platforms (not shown in FIG. 1). In some implementations, a distributed computing platform may be implemented by a set of client computing platforms and/or servers (including, for example, one or more decentralized ledger servers 111). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of blockchain 117a. The smart contracts may be stored on blockchain 117a, blockchain 117b, and/or another decentralized ledger. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a decentralized virtual machine.

In some implementations, at least one of the decentralized ledgers implemented by decentralized ledger servers 111 is a private decentralized ledger. The private decentralized ledger may be configured to record information. The recorded information may pertain to unique digital articles that are associated with in-game user-controllable characters that are configured to be used in the instance of the game. The recorded information may include ownership of the unique digital articles. Implementing the in-game actions in the instance of the game may include, for at least some of the in-game actions implemented in the instance of the game, effectuating modifications to the recorded information pertaining to the unique digital article. For example, ownership rights and/or other rights may be modified. In some implementations, a unique digital article may be removed from one decentralized ledger and added or recorded on another decentralized ledger. In some implementations, at least one of the decentralized ledgers implemented by decentralized ledger servers 111 is a public decentralized ledger. The public decentralized ledger may be configured to be part of either EOSIO mainnet, Ethereum mainnet, Ethereum 1.5, Ethereum 2.0, a derivative of Ethereum 2.0 that is configured to perform transactions of Ether (ETH) between accounts, or a derivative of EOSIO that is configured to perform transactions of EOS between different accounts.

Elements of blockchain 117a or another decentralized ledger may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

As depicted in FIG. 1, decentralized ledger server 111a may include one or more of electronic storage 130b, processor(s) 132b, machine-readable instructions 106b, (node of) blockchain 117a, and/or other components. Machine-readable instructions 106b may include one or more instruction components. The instruction components may include computer program components. The instruction components may include one or more of transaction component 134, receipt component 136, and/or other instruction components. In some implementations, an individual decentralized ledger server may be dedicated to a particular node of a decentralized ledger. Typically, different nodes are included in (or implemented by, or hosted by) different servers or different computer systems to increase the safety and security of transactions on a decentralized ledger. The consensus protocol used for a particular decentralized ledger will be harder to falsify or circumvent when the different nodes are in different geographical locations, on different types of computing platforms, and/or otherwise distributed and diverse. As depicted in FIG. 1, blockchain 117a may include a unique digital article 15 (by way of non-limiting example, unique digital article 15 may be associated with a user-controllable in-game character, as depicted, and unique digital article 15 may have been recorded on blockchain 117a, as depicted). Decentralized ledger server 111b may include similar components as decentralized ledger server 111a, including but not limited to blockchain 117b and/or other components.

In some implementations, one or more decentralized ledgers implemented by decentralized ledger servers 111 may be publicly accessible. In some implementations, one or more decentralized ledgers implemented by decentralized ledger servers 111 may be private and/or permissioned. In some implementations, one or more decentralized ledgers implemented by decentralized ledger servers 111 may be append-only. In some implementations, existing blocks of one or more decentralized ledgers implemented by decentralized ledger servers 111 can substantially not be altered or deleted, unless multiple copies are altered. This is unlikely to happen provided that the multiple copies stored on different computing platforms, e.g., in different geographical locations. Decentralized ledgers may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication, as well as repudiation.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, system 100 and/or decentralized ledger server(s) 111 may be configured to communicate with one or more of online gaming platform(s) 105, users 123, and/or other entities and/or components, e.g., through one or more networks 13.

Server(s) 102 may include electronic storage 130, processor(s) 132, machine-readable instructions 106, and/or other components. Server(s) 102 may be configured by machine-readable instructions 106. Machine-readable instructions 106 may include one or more instruction components. The instruction components may include computer program components. The instruction components may include one or more of a game component 108, an interaction component 110, an account component 112, a recording component 114, a grouping component 116, a performance component 118, a ledger-analysis component 120, a notification component 122, a distribution component 124, an adjustment component 126, a ledger component 128, a population component 129, a reward component 131, a presentation component 133, a transaction component 134, a receipt component 136, an input component 135, a communication component 137, and/or other instruction components. Processor(s) 132a and processor(s) 132b may be similar to processor(s) 132 as described elsewhere in this disclosure, though included administration servers 115 and decentralized ledger servers 111, respectively, as depicted in FIG. 1. Machine-readable instructions 106a and machine-readable instructions 106b may be similar to machine-readable instructions 106 as described elsewhere in this disclosure, though included in administration servers 115 and decentralized ledger servers 111, respectively, as depicted in FIG. 1.

Game component 108 is configured to execute, via online gaming platform 105, one or more instances of one or more games. An instance of a game may facilitate presentation of the game to users 123. For example, the instance of the game may be an online game executed with online gaming platform 105. Game component 108 may be configured to implement in-game actions in the instance of the game, e.g., in response to action requests for the in-game actions by the users. In some implementations, game component 108 may be arranged, organized, and/or otherwise included in online gaming platform 105. As used herein, the term "game" may refer to one or more games within online gaming platform 105. In some implementations, the game may be provided via a virtual space, and may include a plurality of resource types and/or maps.

The presentation of the game may be based on the views of the game that are determined during execution of the game, e.g., as based on instructions and/or other input from users. In some implementations, the view may be communicated (e.g., by streaming, via object/position data, and/or other information) from online gaming platform 105, decentralized ledger server(s) 111, and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the game may include a simulated space that is accessible by users 123 by clients (e.g., client computing platforms 104) that present the views of the virtual space to a user. The simulated space may have a topography, express ongoing real-time interaction by one or more users 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, users 123 may control characters, objects, simulated physical phenomena, and/or other elements within the virtual space to interact with the virtual space and/or each other. The user characters may include avatars. As used herein, the term "user character"

may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). In some implementations, user-controlled characters may be capable of locomotion within the topography of the simulated space that is included in the instance of the game. In some implementations, user-controlled elements controlled by and/or associated with a given user may be created and/or customized by the given user. Individual users 123 may have or control an "inventory" of virtual goods and currency (e.g., resources of the plurality of resource types) that the individual user can use (e.g., by manipulation of a user character and/or other user-controlled elements) and/or other items, to perform in-game actions within the virtual space. By way of non-limiting illustration, users 123 may include the first user and the second user that interact with online gaming platform 105. The first user and the second user may control digital assets (e.g., characters) in a game hosted by online gaming platform 105. In some implementations, account inventories may be managed (at least in part) using blockchain 117*a*. For example, ownership rights (and/or other types of rights) of individual virtual items included in an individual account inventory may be recorded on blockchain 117*a*. In some implementations, individual account inventories may correspond to individual smart contracts stored on blockchain 117*a*.

Interaction component 110 may be configured to enable, facilitate, and/or implement in-game actions by users 123 in instances of games. In some implementations, interaction component 110 may be configured to operate in response to instructions and/or action requests by users 123. For example, one or more users may interact within online gaming platform 105 to build, create, gather, find, combine, and/or otherwise generate content (i.e., user-generated content). In some implementations, operations may be accomplished by interaction component 110 through user interfaces 125. In particular, operations pertaining to a particular user may be accomplished through a particular user interface 125 of a particular client computing platform 104, where the particular client computing platform 104 is associated with the particular user. In other words, the particular user may interact with an instance of a game through interaction component 110 and/or the particular user interface 125. For example, interaction component 110 may be configured to receive indications of acceptance from users, through associated client computing platforms 104 (or, e.g., a particular user interface 125 of a particular client computing platform 104). For example, an acceptance may accept a particular offer to partake in an activity or agreement. In some implementations, interaction component 110 may be configured to receive indications of agreements from users, through associated client computing platforms 104 (or, e.g., a particular user interface 125 of a particular client computing platform 104).

In some implementations, interaction component 110 may be configured to facilitate interaction of users 123 with system 100. In some implementations, interaction component 110 may be configured to facilitate interaction by users 123 through user interfaces 125. For example, a particular user may be associated with a particular client computing platform 104, which may include a particular user interface 125. In other words, an individual user interface may be user-specific and/or specific to a particular client computing platform. In some implementations, interaction component 110 may facilitate entry and/or selection through (presentation of) one or more user interfaces 125 (such as, by way of non-limiting example, any of the interfaces described in this disclosure).

Account component 112 is configured to manage user accounts. User accounts may be associated with users 123. User accounts may include and/or be associated with account inventories of virtual items. For example, the user accounts may include a first user account associated with a first user, and so forth. For example, the first user account may include a first account inventory of one or more virtual items, and so forth. Individual users may control one or more virtual items in their individual account inventories. In some implementations, the first account inventory includes a first unique digital article. The first unique digital article may be associated with a first in-game user-controllable character configured to be used (e.g., played with) in the instance of the game.

Recording component 114 is configured to record assets on decentralized ledgers. In some implementations, recording component 114 may record ownership of assets. In some implementations, recording component 114 may be configured to receive requests to perform a recordation. For example, recording component 114 may receive, on behalf of a first user, a recordation request to record ownership of a first unique digital article on a first decentralized ledger (such as, e.g., blockchain 117*a*). In some implementations, recording component 114 may receive such requests from online gaming platform 105 and/or other components of system 100. For example, a particular request to record a particular unique digital article may correspond to the issuance and/or creation of that particular unique digital article. When a unique digital article or other digital asset that is not fungible is issued and/or created, recording component 114 may record its ownership on a particular decentralized ledger.

Grouping component 116 may be configured to receive action request to use unique digital articles and other digital assets that are not fungible in particular manners in the instance of the game. The particular manners may include a first type of usage, a second type of usage, a third type of usage, and/or other types of usage. For example, a unique digital article may be used in a first unique digital article type of usage. Grouping component 116 may be configured to group and/or select under which type of usage a requested manner of usage falls. For example, a first action request may be to use a first unique digital article in a first manner of usage (or more specifically, a first requested manner of usage). For example, a second action request may be to use a second unique digital article in a second manner of usage (or more specifically, a second requested manner of usage), and so forth. Grouping component may group a requested manner of usage in a particular type of usage (e.g., the first type, the second type, the third type, etc.). In some implementations, different types of usage may be mutually exclusive, such that a single requested manner of usage cannot be grouped under more than one type of usage. In some implementations, the different types of usage may include passive manners of usage including display of unique digital articles or associated in-game user-controllable characters (e.g., in account inventories). In some implementations, the different types of usage may include active manners of usage including interactive gameplay in the instance of the game using unique digital articles or associated in-game user-controllable characters as being controlled by users 123. In some implementations, the different types of usage may include different types of exchanges, including but not limited to selling a unique digital article. One or more types of exchanges may be considered passive manners of usage (e.g., selling a unique digital article), whereas other types of exchanges may be considered active manners of usage (e.g., using a unique digital article in a player-to-player challenge). Grouping different types of usage (including different types of exchange) in a first type, a second type, a third type, and so forth may be configurable and/or modifiable by an administrative user.

In some implementations, the different types of usage may include receiving one or more participation rewards or attendance awards for either a particular unique digital article participating in an online event or attending an online event (e.g., during a particular time-limited duration). Alternatively, and/or simultaneously, the different types of usage may include receiving one or more participation rewards or attendance awards for a particular user (e.g., who owns the particular unique digital article) participating in a real-world event or attending a real-world event (e.g., during a particular time-limited duration). In some implementations, the different types of usage may include receiving distribution gains by virtue of owning distribution rights for one or more particular unique digital articles. In some implementations, grouping component 116 may receive a particular action request to use a particular unique digital article in a particular manner of usage in the instance of the game due to (or effectuated by, or caused by) a user attempting to use the particular unique digital article in the particular manner. In some implementations, grouping component 116 may receive a particular action request to use a particular unique digital article in a particular manner of usage in the instance of the game caused by a user attempting to use the particular unique digital article in the particular manner. In some implementations, receipt of a particular action request to use a particular unique digital article in a particular manner of usage in the instance of the game may be effectuated by a user using or attempting to use the particular unique digital article in the particular manner. For example, grouping component 116 may receive such action requests from online gaming platform 105 and/or other components of system 100.

Performance component 118 may be configured to permit and/or perform requested manners of usage of unique digital articles. In some implementations, permission to use a particular unique digital article in accordance with a particular action request may be granted responsive to the particular manner of usage (as requested in the particular action request) being grouped (e.g., by grouping component 116) in a particular type of (unique digital article) usage. For example, permission may be granted for requested manners of usage that are grouped in the first type of usage, but not the second type of usage. For example, requested manners of usage may be performed if grouped in the first type of usage, but not the second type of usage. In some implementations, performance component 118 may permit and/or perform some types of usage (e.g., first and third type of usage), but not other types of usage (e.g., second and fourth type of usage). In some implementations, permission and/or performance may be prevented for certain types of usage (e.g., second and fourth type of usage), unless the pertinent unique digital article (or other digital asset that is not fungible) is currently recorded on a particular decentralized ledger (or type of decentralized ledger, such as a private decentralized ledger).

In some implementations, permission and/or performance by performance component 118 may require not only a particular type of requested usage, but additionally may require the pertinent unique digital article (or other digital asset that is not fungible) currently be recorded on a particular decentralized ledger (or type of decentralized ledger). For example, a requirement for permission or performance may include recordation on a private decentralized ledger. In some implementations, actions by performance component 118 may be performed responsive to particular actions or results from other components of system 100, including but not limited to grouping component 116 and/or ledger-analysis component 120.

Ledger-analysis component 120 may be configured to determine whether one or more unique digital articles are recorded on a particular decentralized ledger. For example, ledger-analysis component 120 may determine whether a first unique digital article is currently recorded on a private decentralized ledger. In some implementations, ledger-analysis component 120 may be configured to analyze recordations and other transactions on one or more decentralized ledgers, e.g., by retrieving recorded information from the one or more decentralized ledgers and analyzing whether any of the recorded transactions pertain to a particular unique digital article, or a set of unique digital articles. In some implementations, determinations by ledger-analysis component 120 may be performed responsive to particular actions or results from other components of system 100, including but not limited to grouping component 116. In some implementations, ledger-analysis component 120 may be configured to determine whether ownership of a particular unique digital article (or other digital asset that is not fungible) has ever been recorded on a public decentralized ledger. For example, actions by other components of system 100, including but not limited to distribution component 124, may be responsive to determinations by ledger-analysis component 120.

Notification component 122 may be configured to notify users. For example, notification component 122 may notify users in response to action requests, reward requests, and/or other requests. In some implementations, a user may be notified responsive to a requested manner of usage of a particular unique digital article (as requested through an action request) not being permitted or performed by performance component 118. In some implementations, actions by notification component 122 may be performed responsive to particular actions, results, determinations, or decisions from other components of system 100, including but not limited to grouping component 116, performance component 118, ledger-analysis component 120, and/or population component 129. For example, notification component 122 may respond to a particular action request (by a particular user, and pertaining to a particular unique digital article) with a particular response such that, responsive to the particular manner of usage, as requested in the particular action request, being grouped under a particular type (e.g., the second type) of unique digital article usage, and further responsive to determining the particular decentralized ledger on which the particular unique digital article has been recorded is a public decentralized ledger, the particular response notifies the particular user that the particular user is not permitted to use the particular unique digital article according to the particular action request. In some implementations, notification component 122 may notify users responsive to comparisons involving one or more determined fractions (e.g., of sets of unique digital articles for which ownership is recorded on a particular decentralized ledger, as determined by population component 129). For example, users may be notified if a reward has been adjusted and/or modified, or could have been adjusted and/or modified.

Distribution component 124 may be configured to distribute and/or otherwise provide one or more of information, access to in-game content, access to game-specific communication channels, certificates, rewards, awards, prizes, distribution gains, and/or virtual items to users 123. Distributions by distribution component 124 may be adjusted, e.g., by adjustment component 126. In some implementations, distributions may be responsive to determinations by reward component 131. In some implementations, distributions may be based on and/or responsive to actions by other components of system 100, including but not limited to ledger-analysis component 120. For example, online gaming platform 105 may determine a particular user is eligible to receive one or more rewards or awards. Distribution component 124 may distribute the one or more rewards or awards in accordance with the determined eligibility and/or a comparison involving a determined fraction (e.g., as determined by population component 129). For example, a reward may be a participation reward. For example, an award may be an attendance award. For example, a certificate may be a certificate of completion or accomplishment, which may be specific to actions within the instance of the game. For example, a prize may be for effort, time, and/or resources spent, specifically in the instance of the game. For example, particular unique digital articles may be associated with distribution rights, and the particular user who owns those distribution rights may receive distribution gains in accordance with those distribution rights. For example, distribution gains may result from a particular action or activity (such as, e.g., a sale of a particular digital asset), e.g., within the online gaming platform 105, involving the particular digital asset.

Adjustment component 126 may be configured to adjust and/or modify distributions, including (planned or expected) distributions by distribution component 124. In some implementations, adjustment component 126 may adjust and/or modify one or more certificates, rewards, awards, prizes, distribution gains, and/or virtual items that have been determined by reward component 131 (also referred to as the determined distribution or the eligible distribution). Upon such adjustment and/or modification, this determined distribution (or eligible distribution) may be referred to as the adjusted distribution.

In some implementations, the eligible distribution (i.e., the one or more particular rewards, as determined by, e.g., reward component 131) may be adjusted and/or modified based on the determined fraction (of the set of unique digital articles for which ownership is currently recorded on a private decentralized ledger, as determined, e.g., by population component 129). In some implementations, such adjustment and/or modification may be performed such that individual values of the one or more particular rewards correlate positively with the determined fraction. The greater the determined fraction is (of the set of unique digital articles for which ownership is currently recorded on a private decentralized ledger), the more individual values of the one or more particular rewards are increased. Conversely, the smaller the determined fraction is (of the set of unique digital articles for which ownership is currently recorded on a private decentralized ledger), the more individual values of the one or more particular rewards are decreased. As used here, increasing and decreasing may be comparative to the eligible distribution. In some implementations, adjustment component 126 may be configured to adjust and/or modify one or more particular rewards based on a function. In some implementations, this function may be monotonically increasing. In some implementations, this function may be a positive monotonic transformation. In some implementations, an administrative user may enter and/or select user input that represents this function (e.g., through a user interface presented through administration server 115).

Distribution component 124 may distribute the adjusted distribution. In some implementations, adjustments and/or modifications by adjustment component 126 may increase the value of one or more elements of the eligible distribution (this may provide a positive incentive to users to record particular unique digital articles on a particular decentralized ledger). Alternatively, and/or simultaneously, adjustments and/or modifications by adjustment component 126 may decrease the value of one or more elements of the eligible distribution (this may provide a negative incentive to users to record particular unique digital articles on a particular decentralized ledger). In some implementations, actions by adjustment component 126 may be performed responsive to particular actions or results from other components of system 100, including but not limited to ledger-analysis component 120 and population component 129.

Ledger component 128 may be configured to generate sets of instructions for decentralized ledger servers 111 (e.g., decentralized ledger server 111*a*) and/or one or more decentralized ledgers (e.g., blockchain 117*a*). In some implementations, ledger component 128 may be configured to transfer the generated sets of instructions to decentralized ledger servers 111 and/or one or more decentralized ledgers. In some implementations, one or more of these instructions may instruct the formation of a smart contract and/or the recording of the smart contract on the one or more decentralized ledgers (e.g., blockchain 117*a*). In some implementations, these instructions may instruct decentralized ledger servers 111 to record and/or modify unique digital articles, assets, transactions, and/or rights on one or more decentralized ledgers. For example, ledger component 128 may transfer a particular set of instructions that, upon execution by blockchain 117*a* and blockchain 117*b*, remove a particular unique digital article from blockchain 117*a* and add the particular unique digital article to blockchain 117*b*.

Population component 129 may be configured to determine the size of a set of unique digital articles. In some implementations, a set of unique digital articles may have a common user in control. In some implementations, a set of unique digital articles may have common visual characteristics as in-game user-controllable characters (but may, e.g., be owned by multiple different users). For example, all semi-fungible digital assets from one or more limited sets may form a set of unique digital articles. For example, all digital assets (that are not fungible) that are issued (or that may be issued) by the same smart contract may form (part of) a set of unique digital articles. For example, all "Dazzle Blankos" that could be or have been issued may form a particular set of unique digital articles. As another example, the combination of all "Boss Dino Blankos" and all "Dazzle Blankos" that have been issued to date (ignoring those that still could be issued in the future) may form a specific set of unique digital articles. Population component 129 may control (and/or be configured by an administrative user regarding) how the size or population of a set of unique digital articles is determined. In some implementations, population component 129 may be configured to determine fractions of sets of unique digital articles for which ownership is recorded on a particular decentralized ledger (e.g., on the private decentralized ledger). In some implementations, population component 129 may be configured to determine fractions of sets of unique digital articles for which ownership is not recorded on a particular decentralized ledger (e.g., on the private decentralized ledger). In some implementations, the specific definition used by population component 129 to determine a population may be modified (e.g., by an administrative user) to include and/or exclude certain types of unique digital article, or unique digital article having certain characteristics, and/or to otherwise apply a filter to a larger set of unique digital article in order to create a subset of unique digital article that is smaller. In some implementations, population component 129 may be configured to compare a determined fraction (of a set of unique digital articles for which ownership is recorded on a particular decentralized ledger) with a threshold value. For example, the determined fraction may meet the threshold value, exceed the threshold value, or fail to meet the threshold value. In some implementations, population component 129 may be configured to compare a determined fraction with multiple threshold values. In some implementations, population component 129 may be configured to use a function that takes a determined fraction as input and produces a result that represents how to adjust and/or modify (eligible) distributions. In some implementations, comparisons by population component 129 may be used to control actions and/or operations by other components of system 100, including but not limited to distribution component 124 and adjustment component 216.

Reward component 131 may be configured to determine eligibility for unique digital articles, other digital assets that are not fungible, and/or users 123 to receive one or more of information, access to in-game content, access to game-specific communication channels, certificates, (participation) rewards, (attendance) awards, prizes, distribution gains, and/or virtual items. In some implementations, reward component 131 may be configured to receive reward requests to provide one or more of information, access to in-game content, access to game-specific communication channels, certificates, rewards, awards, prizes, distribution gains, and/or virtual items to users 123 and/or particular unique digital articles. In some implementations, these types of determinations or (reward) requests may be based on and/or responsive to actions by other components of system 100, including but not limited to ledger-analysis component 120. In some implementations, online gaming platform 105 may determine a particular user is eligible to receive one or more rewards or awards. In some implementations, online gaming platform 105 may provide reward requests for one or more rewards or awards. For example, responsive to a user accomplishing a predetermined milestone in the instance of the game, a reward request may be provided to reward component 131, e.g., by online gaming platform 105. Distributions in accordance with the determined eligibility may be made by distribution component 124. In some implementations, (one or more elements of) such eligible distributions may be adjusted and/or modified by adjustment component 126 prior to being distributed.

Presentation component 133 may be configured to present interfaces (e.g., user interfaces 125) to users, e.g., through client computing platforms 104 associated with the respective users. In some implementations, presentation component 133 may be configured to effectuate presentations of interfaces to users. The presented interfaces may include challenge interfaces, as described in this disclosure. In some implementations, presentations by presentation component 133 may be performed jointly (or at least in some cooperative manner) with one or both of game component 108 and/or interaction component 110. Presentation component 133 may present offers (from other users) to particular users, as described elsewhere in this disclosure.

Receipt component 136 may be configured to receive (sets of) instructions to add, modify, and/or remove recorded rights in blockchain 117*a*. For example, receipt component 136 may receive one or more sets of instructions from ledger component 128, online gaming platform 105, and/or other components of system 100. Receipt component 136 may provide received sets of instructions to record component 134 for execution. In some implementations, execution of individual ones of the instructions received may include invoking one or more function calls of an Application Programming Interface (API) 107. For example, API 107 may be configured to provide interactive communication between blockchain 117*a* and other components of system 100. For example, in some implementations, API function calls may be implemented as function calls to smart contracts stored on blockchain 117*a*. In some implementations, receipt component 136 may be arranged, organized, and/or otherwise included in decentralized ledger server 111 and/or blockchain 117*a*.

Transaction component 134 may be configured to record (ownership) rights pertaining to digital assets, e.g., on blockchain 117*a*. In some implementations, transaction component 134 may record rights on electronic storage 130*b*. In some implementations, transaction component 134 may record rights on blockchain 117*a*. The rights may include ownership rights, distribution rights, and/or other rights. For example, particular recorded rights may reflect ownership of a particular digital asset by a particular user or group of users. For example, the particular digital asset may be not fungible, and may represent a three-dimensional in-game user-controllable item or character that can interact with other virtual items within online gaming platform 105. Recorded rights may be asset-specific. For example, distribution rights for a particular digital asset may designate rights to certain distributions of benefits upon a specifically defined in-game action (e.g., an exchange between users) involving the particular digital asset.

In some implementations, transaction component 134 may be configured to record rights in blockchain 117*a*. In some implementations, transaction component 134 may add, modify, and/or remove recorded rights. For example, in accordance with received instructions from receipt component 136, transaction component 134 may transfer ownership of a particular digital asset from a first owner to a second owner (e.g., from an original owner to a new owner, or from a loser of a challenge to a winner of the challenge) such that the recorded rights on blockchain 117*a* no longer reflect the ownership of the particular digital asset by the first user. In some implementations, in accordance with received instructions, transaction component 134 may transfer ownership of a particular digital asset temporarily, e.g., from a first owner to a temporary second owner such as a smart contract. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, transaction component 134 may transfer ownership of a particular digital asset non-temporarily from a first owner to a second owner, e.g., when a particular exchange is not reversible or no longer reversible. In some implementations, transaction component 134 may be arranged, organized, and/or otherwise included in blockchain 117a.

In some implementations, transaction component 134 may be configured to obtain asset-specific rights (e.g., ownership rights, distribution rights, and/or other rights) for particular digital assets. In some implementations, transaction component 134 may be configured to access blockchain 117a to obtain the asset-specific rights (that are recorded on blockchain 117a, e.g., in one or more smart contracts).

Input component 135 may be configured to receive user input from administrative users. For example, the user input may include entry and/or selection of particular information, unique digital articles, virtual items, and/or any entity or object that interacts with any part of system 100 and/or plays a part in the operation of system 100. For example, an administrative user may select a particular set of unique digital articles (e.g., all "Dazzle Blankos" that have been issued) as the input set of unique digital articles for other components of system 100, such as population component 129. Additionally, the administrative user may select a particular adjustment to be enacted by adjustment component 126 (e.g., increase the value of one or more elements of the eligible distribution) for one or more types of determinations by reward component 131 (e.g., an eligible distribution of a reward of 100 virtual coins for leveling up a unique digital article in the selected set of unique digital articles, provided that the particular unique digital article is currently recorded on the private decentralized ledger, as determined by ledger-analysis component 120). Based on these inputs and/or selections by the administrative user, system 100 may provide a ledger-specific utility for (a set of) unique digital articles that incentivizes recording these unique digital articles on a specific decentralized ledger.

As another example, the administrative user may select a different set of unique digital articles (e.g., all "Boss Dino Blankos" that have been issued) as the input set of unique digital articles for other components of system 100, such as population component 129. Additionally, the administrative user may select a particular adjustment to be enacted by adjustment component 126 (e.g., decrease the value of one or more elements of the eligible distribution) for one or more types of determinations by reward component 131 (e.g., an eligible distribution may be receiving the distribution gains based on particular in-game actions for unique digital articles in the selected set of unique digital articles, provided that the particular unique digital article is currently recorded on the public decentralized ledger, as determined by ledger-analysis component 120). Based on these inputs and/or selections by the administrative user, system 100 may provide a ledger-specific utility for (a selected set of) unique digital articles that incentivizes recording these unique digital articles on the private decentralized ledger.

Communication component 137 may be configured to facilitate communication and/or interaction between administration server 115 and the rest of system 100. For example, communication component 137 may communicate user input received by input component 135 to other components of system 100, particularly of online gaming platform 105.

Referring to FIG. 1, user interfaces 125 may be configured to facilitate interaction between users 123 and system 100 and/or between users 123 and client computing platforms 104. For example, user interfaces 125 may provide an interface (e.g., a challenge interface) through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between users.

Figure 3:
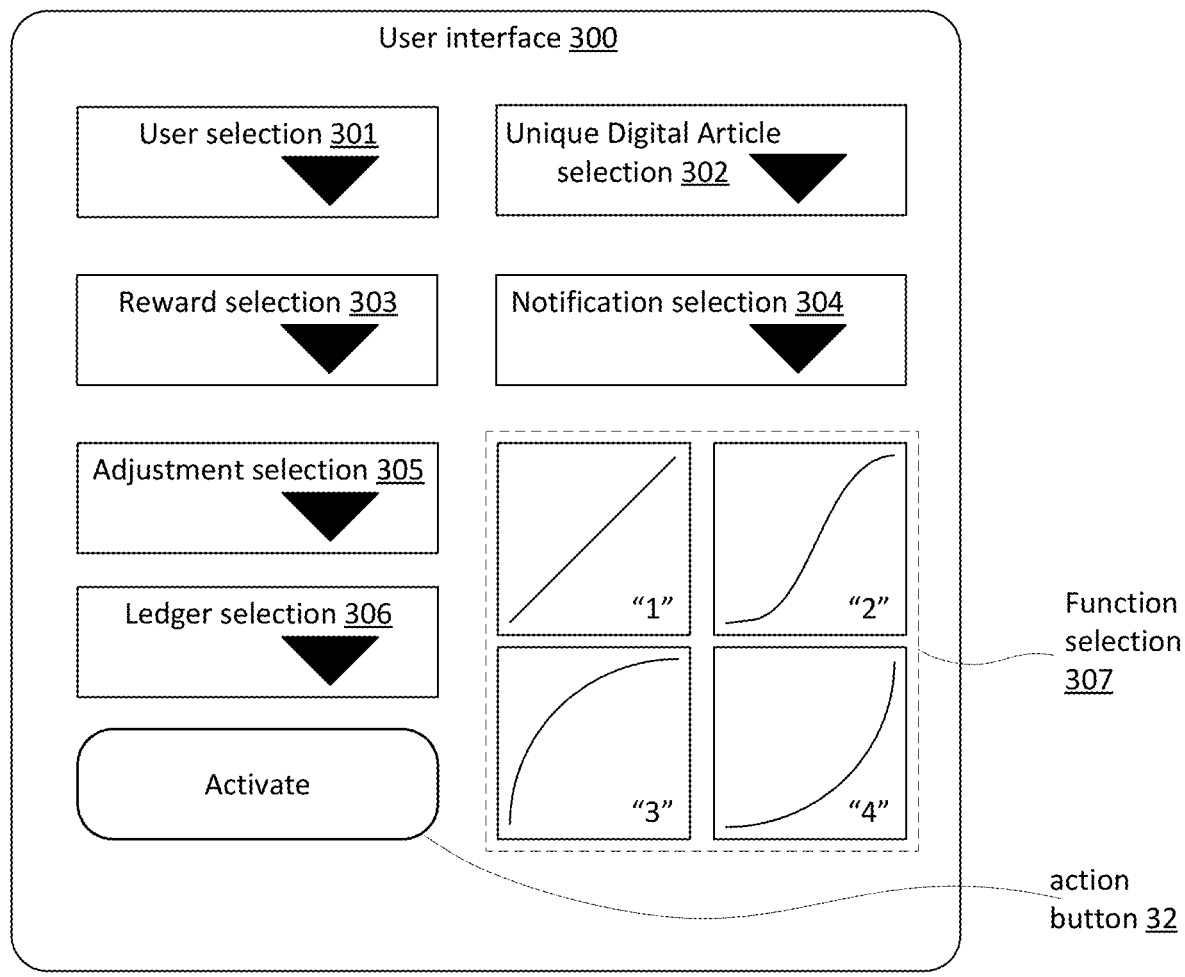
FIGS. 3-4 illustrate example implementations of user interfaces, as may be used by a system configured to provide automatic administration based on ledger-specific populations of unique digital articles and other digital assets that are not fungible in an online gaming platform, in accordance with one or more implementations.

FIG. 3 illustrates an example implementation of a user interface 300 as may be used by system 100, in accordance with one or more implementations. User interface 300 may enable a particular user (e.g., an administrative user) to provide administration based on ledger-specific populations of unique digital articles and other digital assets that are not fungible. User interface 300 may include sections or fields for user selection 301, unique digital article selection 302, reward selection 303, notification selection 304, adjustment selection 305, ledger selection 306, function selection 307, and/or other graphical user interface elements. User selection 301 may enable an administrative user to enter and/or select one or more users (e.g., through one or more text fields or one or more dropdown menus, as indicated by the filled-in triangle), one or more types of users, and/or one or more filters to choose a subset of users. The system as described herein will be used to provide administration for the selected one or more users. For example, in some cases, the administrative user may select a first user. For example, in some cases, the administrative user may select all users who own the particular unique digital article as selected through unique digital article selection 302 (e.g., all "Dazzle Blankos"). unique digital article selection 302 may enable an administrative user to enter and/or select one or more unique digital articles (e.g., through one or more text fields or one or more dropdown menus), one or more types of unique digital articles, and/or one or more filters to choose a subset of unique digital articles. In some implementations, the administrative user may select a set of unique digital articles owned or controlled by the same user who is selected through user selection 301. In some implementations, the administrative user may select a set of unique digital articles that have certain common visual characteristics as in-game user-controllable characters (e.g., due to being issued by the same smart contract). Subsequent to unique digital article selection 302, the size of the selected set of unique digital articles may be determined. Reward selection 303 may enable an administrative user to enter and/or select one or more rewards (e.g., through one or more text fields or one or more dropdown menus), one or more types of rewards, and/or one or more filters to choose a subset of rewards. For example, in some cases, the administrative user may select one or more rewards that may be adjusted in accordance with adjustment selection 305. Notification selection 304 may enable an administrative user to enter and/or select one or more notifications (e.g., through one or more text fields or one or more dropdown menus), or one or more types of notifications (by way of non-limiting example, notify users in advance of adjusting a reward, notify users after adjusting a reward, or both). Adjustment selection 305 may enable an administrative user to enter and/or select (e.g., through one or more text fields or one or more dropdown menus) one or more adjustments to be enacted on one or more rewards (e.g., as selected through reward selection 303), or one or more types of adjustments (by way of non-limiting example, adjustments that form a positive incentive, a negative incentive, or both). For example, in some cases, an adjustment that provides a positive incentive may double the value of a reward. For example, in some cases, an adjustment that provides a negative incentive may reduce the value of a reward by half. In some cases, an administrative user may select a function for adjusting values of rewards based on the determined fraction (e.g., of sets of unique digital articles for which ownership is recorded on the decentralized ledger selected through ledger selection 306). The administrative user may select a function through function selection 307 (here depicted as a choice between four functions labeled "1", "2", "3", and "4", all of which are monotonically increasing functions of adjustments of values of rewards on the vertical axis, e.g., using multipliers ranging from 0.1 to 10, which depend on determined fractions on the horizontal axis, e.g., ranging from 0% to 100%). By using one of these functions, the magnitude of the adjustments may automatically increase as the determined fraction changes over time, thus providing a dynamic balance in favor of the preferred decentralized ledger (e.g., selected through ledger selection 306). Ledger selection 306 may enable an administrative user to enter and/or select one or more decentralized ledgers (e.g., through one or more text fields or one or more dropdown menus, as indicated by the filled-in triangle), or one or more types of decentralized ledgers. For example, in some cases, the administrative user may select a preferred decentralized ledger through ledger selection 306. For example, in some cases, the administrative user may select a type of decentralized ledger that is not preferred, through ledger selection 306. User interface 300 as depicted may further include graphical user interface elements such as, by way of non-limiting example, an action button 32 (which activates and/or initiates automatic administration in accordance with the selections made by the administrative user in user interface 300). In some implementations, the administrative user may automatically select a particular set of unique digital articles (owned by multiple users) based on its determined fraction being heavily skewed to a non-preferred decentralized ledger, and provide (substantial and/or highly valuable) incentives (e.g., positive adjustments using a 10× multiplier) to restore balance to this determined fraction. In some implementations, system 100 may automatically take these actions upon being configured to do so by the administrative user.

Figure 4:
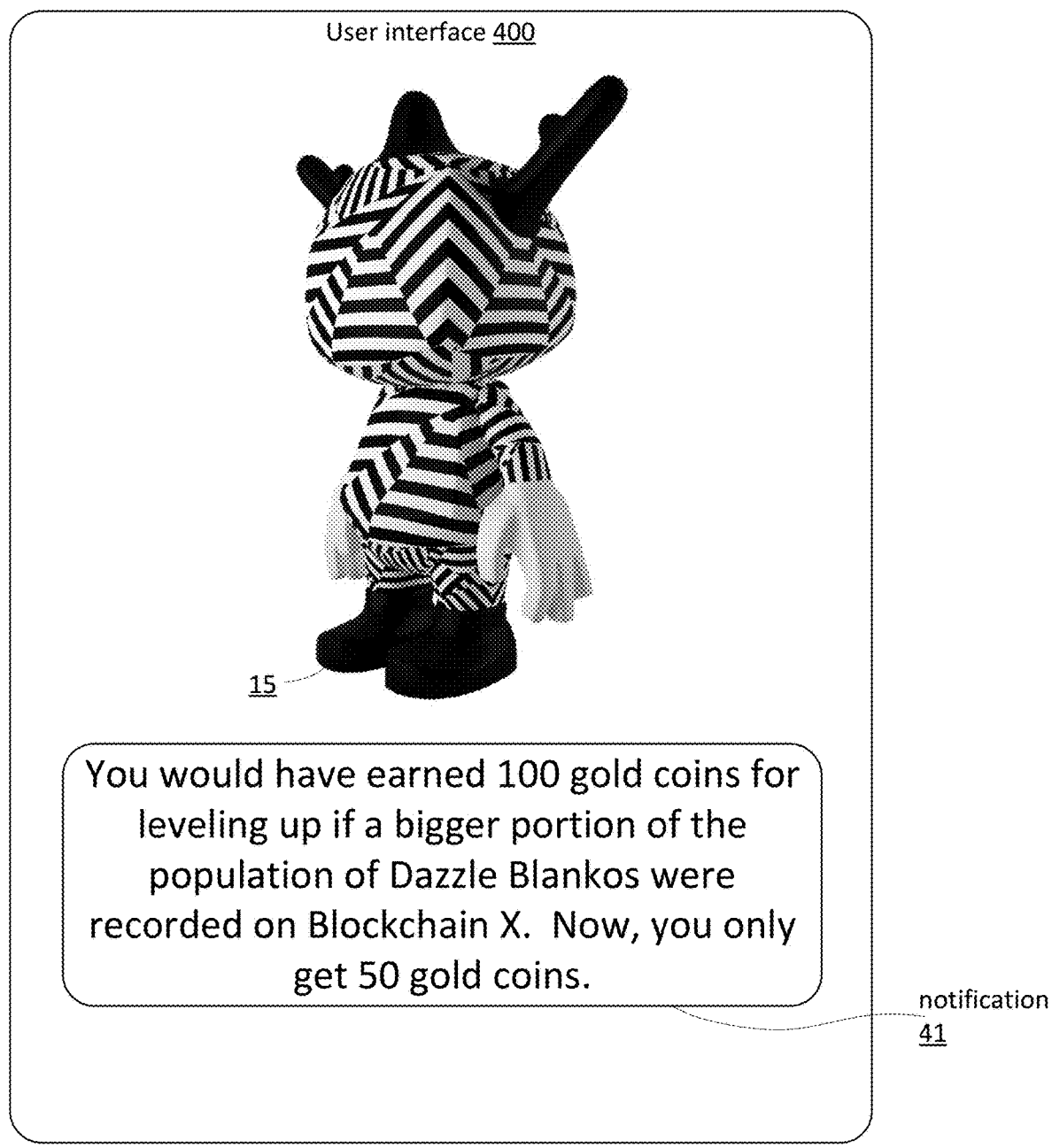

FIG. 4 illustrates an example implementation of a user interface 400 as may be used by system 100, in accordance with one or more implementations. User interface 400 may provide notifications to a particular user (e.g., in accordance with the selections made by an administrative user using user interface 300 in FIG. 3). In FIG. 4, user interface 400 may depict a unique digital article controlled by the particular user, e.g., unique digital article 15. User interface 400 as depicted may further include graphical user interface elements such as, by way of non-limiting example, a notification element 41. Upon particular activity in an instance of a game (e.g., leveling up), notification element 41 is displayed to the particular user, labeled "You would have earned 100 gold coins for leveling up if a bigger portion of the population of Dazzle Blankos were recorded on Blockchain X. Now, you only get 50 gold coins." For example, this "Blockchain X" may be the private decentralized ledger, and may be the preferred decentralized ledger as selected by an administrative user using user interface 300 in FIG. 3. In FIG. 4, notification element 41 explains how the reward has been adjusted and/or decreased due to this unique digital article and/or some others from the set of unique digital articles not being recorded on "Blockchain X". This type of adjustment of a reward (whether announced in advance or after actually occurring) may provide a negative incentive to players to record particular unique digital articles on a particular decentralized ledger (e.g., on the private decentralized ledger).

Figure 5A:
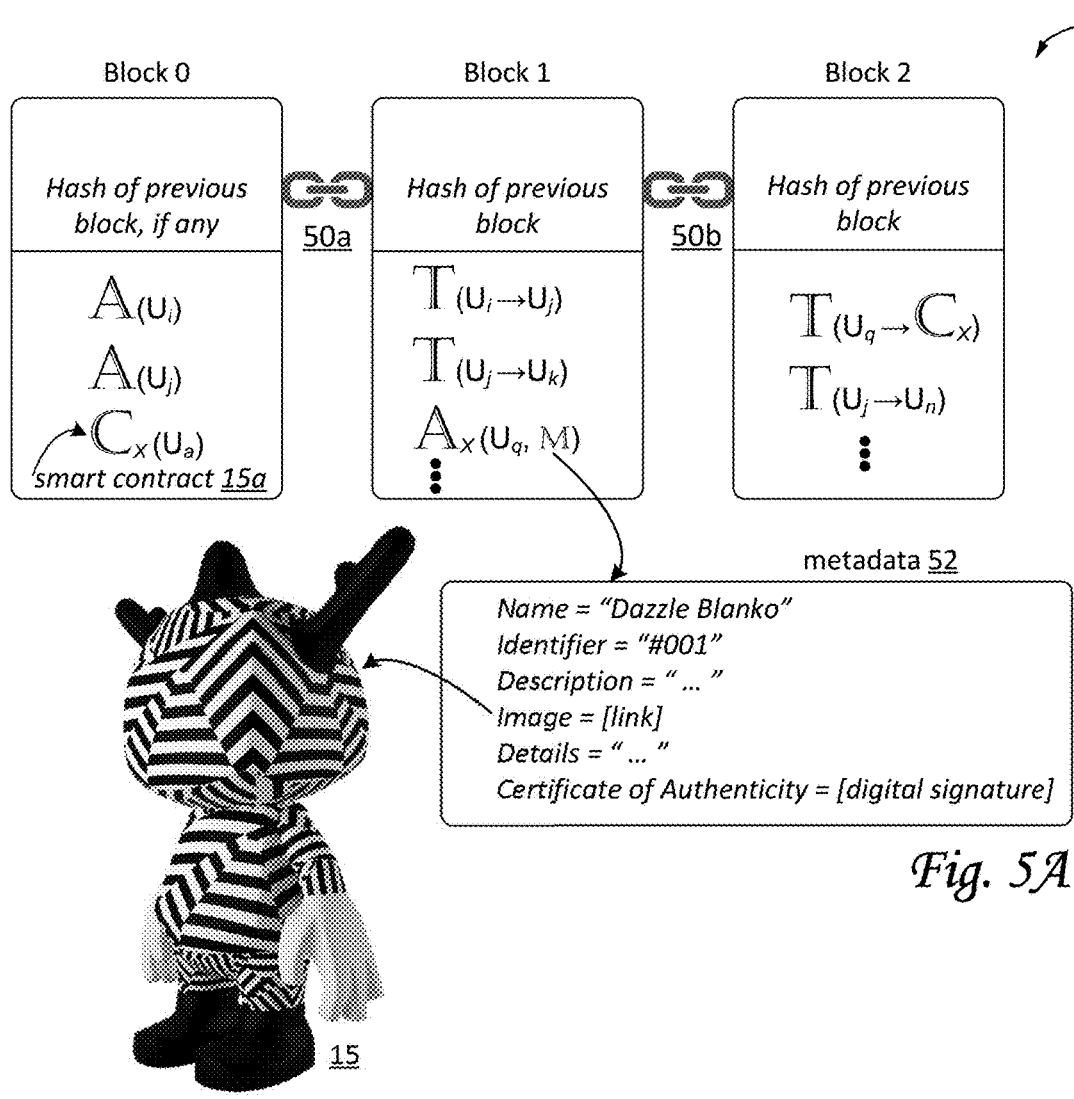
FIGS. 5A-5B illustrates exemplary blockchains, as may be used by a system configured to provide automatic administration based on ledger-specific populations of unique digital articles and other digital assets that are not fungible in an online gaming platform, in accordance with one or more implementations.

FIG. 5A illustrate exemplary blockchain 117c as may be used by system 100, in accordance with one or more implementations. FIG. 5A illustrates a blockchain 117c that includes a block 0, a block 1, and a block 2. As time progresses, more blocks may be added to blockchain 117c. The blocks within blockchain 117c are ordered. In block 0, three assets (indicated by a capital "A") are generated and/or assigned to three users or participants: a first digital asset is assigned to user "i" ($U_i$), a second digital asset is assigned to user "j" ($U_j$), and a third digital asset, smart contract 15a, is assigned to user "a" ($U_a$). For example, smart contract 15a may be or include a template for issuing a particular type of unique digital article. Smart contract 15a may have been posted to blockchain 117c by a component similar to record component 134. For example, the assets in block 0 may be individual ownership rights recorded for particular digital assets within an online gaming platform. Block 1 is connected to block 0 (as indicated by a link 50a), for example by including an address of block 1 in block 0, or vice versa. Likewise, block 1 is connected to block 2, as indicated by a link 50b. In block 1, a transaction to smart contract 15a (indicated by "Ax") is recorded. Transaction Ax to smart contract 15a may issue a unique digital article to user "q", the unique digital article being defined by metadata 52 (here, including a unique digital article named "Dazzle Blanko", having identifier "#001", as depicted by a linked image of unique digital article 15, as well as including various other fields of information). In block 2, several transactions may be recorded: a transaction from user "j" to user "n", and a transaction from user "q" to smart contract 15a. For example, this transaction may represent user "q" using the particular unique digital article with identifier "#001" in some manner (which may or may not lead to a reward for this user). This unique digital article 15 may be part of a set of unique digital articles (that are all issued by smart contract 15a, e.g., all "Dazzle Blankos"). The set of unique digital articles has a determined fraction for which ownership is recorded on blockchain 117c and a remaining fraction for which ownership is recorded on blockchain 117d. Assume blockchain 117d is the preferred private blockchain, as selected by an administrative user. Based on the determined fraction for blockchain 117c, a reward user "q" may be eligible for (e.g., based on the transaction in block 2, or based on activity by this user in the instance of the game) may be adjusted (e.g., decreased in value) or eliminated, because the preferred decentralized ledger is blockchain 117d.

Figure 5B:
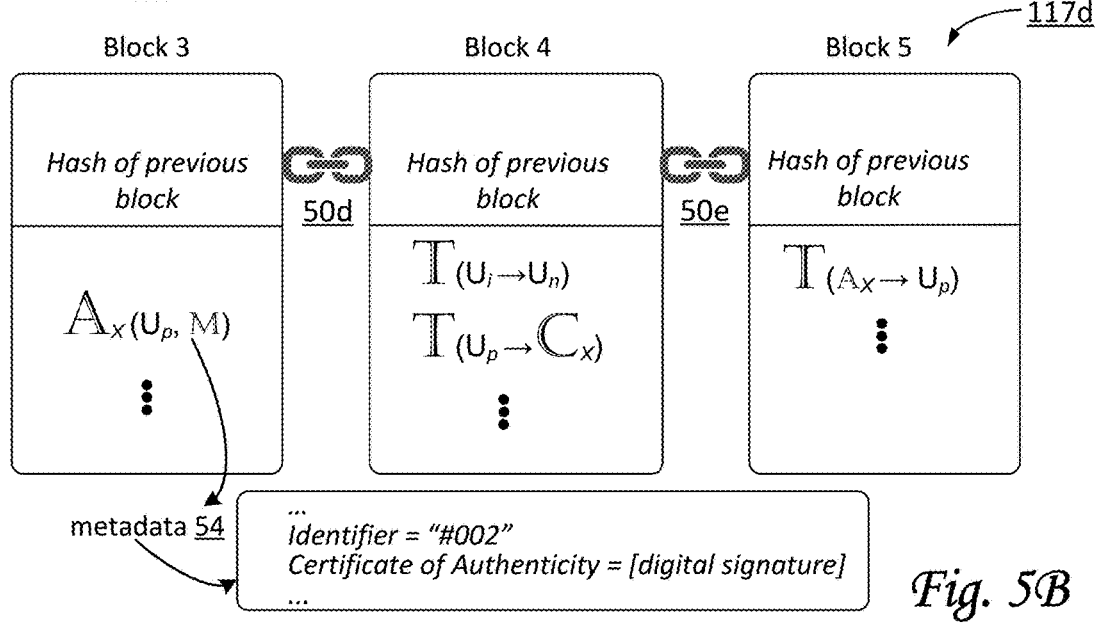

By way of non-limiting example, FIG. 5B illustrates a blockchain 117d that includes several blocks (block 3, block 4, block 5). Block 4 may be connected to block 3 (as indicated by a link 50d), and block 5 may be connected to block 4 (as indicated by a link 50e). In block 3, another transaction to smart contract 15a (indicated by "Ax") is recorded, which issues a unique digital article to user "p", the unique digital article being defined by metadata 54, and having identifier "#002". Block 4 includes a transaction (indicated by a capital "T") from user "i" to user "n". For example, the transaction may represent a purchase of a first virtual item by user n from seller user "i". Additionally, block 4 includes a transaction from user "p" to smart contract 15*a*. For example, this transaction may represent user "p" using the particular unique digital article with identifier "#002" in some manner (which may or may not lead to a reward for this user). Block 5 includes a transaction (by smart contract 15*a*) representing a transfer of a reward to user "p", based on the determined fraction of the set of unique digital articles that is currently recorded on blockchain 117*d*, which is the preferred private decentralized ledger, as selected by an administrative user.

Referring to FIG. 1, in some implementations, online gaming platforms 105, server(s) 102, client computing platform(s) 104, administration servers 115, decentralized ledger servers 111, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which online gaming platforms 105, server(s) 102, client computing platform(s) 104, administration servers 115, decentralized ledger servers 111, and/or external resources 138 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Administration server(s) 115 may include one or more of servers 102*a*, processors 132*a*, machine-readable instructions 106*a*, electronic storage 130*a*, and/or other components. Server(s) 102*a* may be configured by machine-readable instructions 106*a*. Machine-readable instructions 106*a* may include one or more instruction components. The instruction components may include one or more of input component 135, communication component 137, and/or other instruction components. Administration server 115 may include communication lines, or ports to enable the exchange of information with a network and/or other computing platforms. In some implementations, administration servers 115 may be used by one or more administrative users, e.g., to configure and/or control operation of system 100. In some implementations, administrative servers 115 may include or user one or more user interfaces to receive user input and/or otherwise interact with one or more administrative users.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. In some implementations, external resources 138 may include one or more blockchain oracles (as may be used by monitoring component 118 to determine results for challenges).

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 126, 128, 129, 131, 133, 134, 135, 136, and/or 137, and/or other components. Processor(s) 132 may be configured to execute components 108, 110, 112, 114, 116, 118, 120, 122, 124, 126, 128, 129, 131, 133, 134, 135, 136, and/or 137, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 128, 129, 131, 133, 134, 135, 136, and/or 137 are illustrated in FIG. 1 as being implemented within a single processing unit, in implementations in which processor(s) 132 includes multiple processing units, one or more of components 108, 110, 112, 114, 116, 118, 120, 122, 124, 126, 128, 129, 131, 133, 134, 135, 136, and/or 137 may be implemented remotely from the other components. The description of the functionality provided by the different components 108, 110, 112, 114, 116, 118, 120, 122, 124, 126, 128, 129, 131, 133, 134, 135, 136, and/or 137 described below is for illustrative purposes, and is not intended to be limiting, as any of components 108, 110, 112, 114, 116, 118, 120, 122, 124, 126, 128, 129, 131, 133, 134, 135, 136, and/or 137 may provide more or less functionality than is described. For example, one or more of components 108, 110, 112, 114, 116, 118, 120, 122, 124, 126, 128, 129, 131, 133, 134, 135, 136, and/or 137 may be eliminated, and some or all of its functionality may be provided by other ones of components 108, 110, 112, 114, 116, 118, 120, 122, 124, 126, 128, 129, 131, 133, 134, 135, 136, and/or 137. As another example, processor(s) 132 may be configured to execute one or more additional components that may perform some or all of the functionality attributed below to one of components 108, 110, 112, 114, 116, 118, 120, 122, 124, 126, 128, 129, 131, 133, 134, 135, 136, and/or 137.

Figure 2:
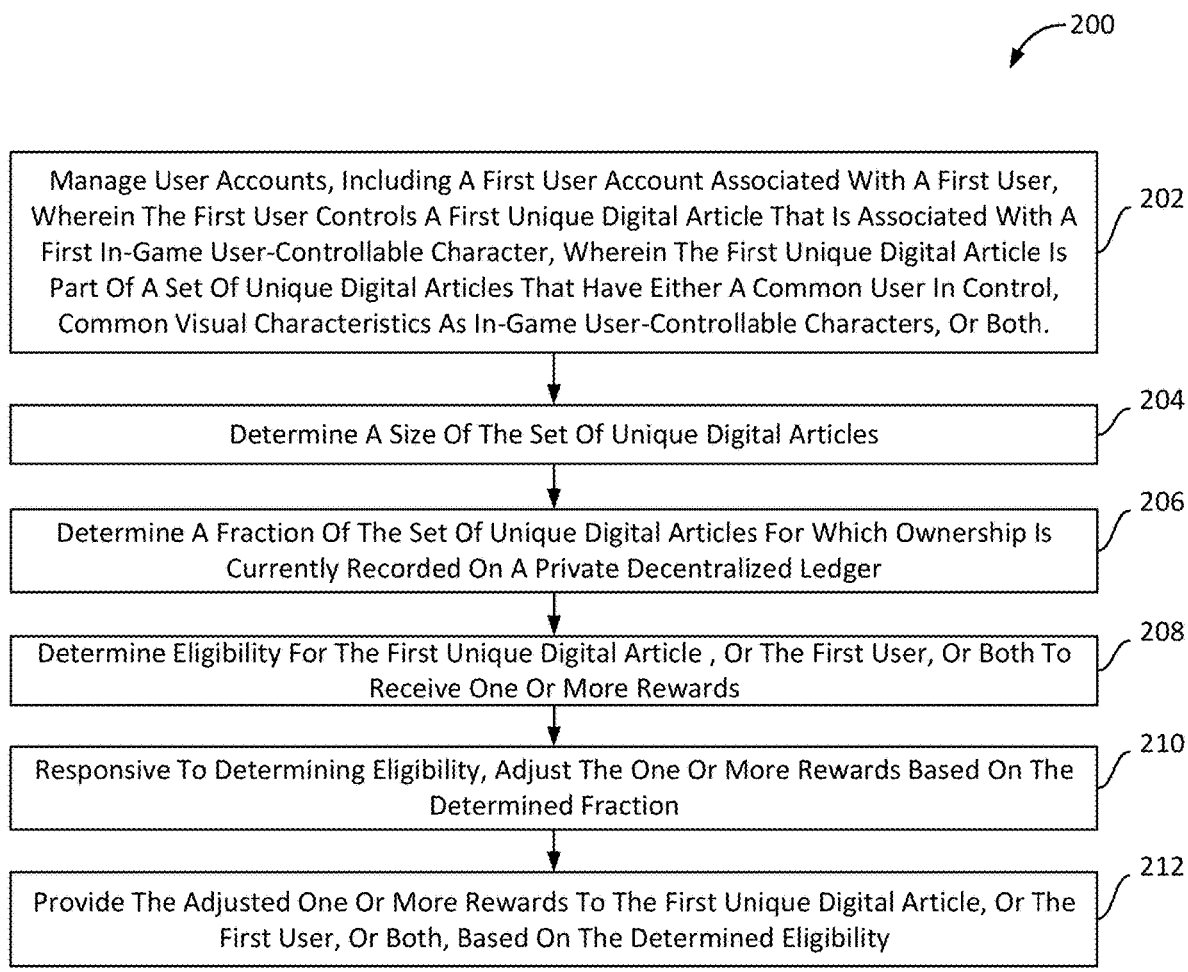
FIG. 2 illustrates a method to provide automatic administration based on ledger-specific populations of unique digital articles and other digital assets that are not fungible in an online gaming platform, in accordance with one or more implementations.

FIG. 2 illustrates a method 200 to provide automatic administration based on ledger-specific populations of unique digital articles in an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, user accounts are managed that are associated with the users. The user accounts include account inventories of virtual items. The user accounts include a first user account associated with the first user. The first user account includes a first account inventory of one or more virtual items. The first user controls the one or more virtual items in the first account inventory. The first account inventory includes a first unique digital article that is associated with a first in-game user-controllable character configured to be used in the instance of the game. The first unique digital article is part of a set of unique digital articles that have either a common user in control, common visual characteristics as in-game user-controllable characters, or both. In some embodiments, operation 204 is performed by an account component the same as or similar to account component 112 (shown in FIG. 1 and described herein).

At an operation 204, a size of the set of unique digital articles is determined. In some embodiments, operation 204 is performed by a population component the same as or similar to population component 129 (shown in FIG. 1 and described herein).

At an operation 206, a fraction of the set of unique digital articles is determined for which ownership is currently recorded on a private decentralized ledger. In some embodiments, operation 206 is performed by a population component the same as or similar to population component 129 (shown in FIG. 1 and described herein).

At an operation 208, eligibility is determined for the first unique digital article, or the first user, or both to receive one or more rewards. In some embodiments, operation 208 is performed by a reward component the same as or similar to reward component 131 (shown in FIG. 1 and described herein).

At an operation 210, responsive to determining eligibility, the one or more rewards are adjusted based on the determined fraction. In some embodiments, operation 210 is performed by an adjustment component the same as or similar to adjustment component 126 (shown in FIG. 1 and described herein).

At an operation 212, the adjusted one or more rewards are provided to the first unique digital article, or the first user, or both, based on the determined eligibility. In some embodiments, operation 212 is performed by a distribution component the same as or similar to distribution component 124 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to provide automatic administration based on ledger-specific populations of unique digital articles in an online gaming platform, wherein the unique digital articles are associated with in-game user-controllable characters configured to be used in instances of games within the online gaming platform, wherein the online gaming platform is configured to execute an instance of a game to facilitate presentation of the game to users, wherein the presentation of the game is based on views of the game that are determined during execution of the instance of the game, wherein the users include a first user and an administrative user, the system comprising:

one or more processors configured by machine-readable instructions to:

manage user accounts associated with the users, wherein the user accounts include account inventories of virtual items, wherein the user accounts include a first user account associated with the first user, wherein the first user account includes a first account inventory of one or more virtual items, wherein the first user controls the one or more virtual items in the first account inventory, wherein the first account inventory includes a first unique digital article that is associated with a first in-game user-controllable character configured to be used in the instance of the game, and wherein the first unique digital article is part of a set of unique digital articles that have either a common user in control, common visual characteristics as in-game user-controllable characters, or both;

determine a size of the set of unique digital articles;

determine a fraction of the set of unique digital articles for which ownership is currently recorded on a private decentralized ledger, wherein the private decentralized ledger is a blockchain;

determine eligibility for the first unique digital article, or the first user, or both to receive one or more rewards;

responsive to determining eligibility, automatically adjust the one or more rewards based on the determined fraction; and control distribution of either the one or more rewards or the adjusted one or more rewards, wherein the distribution is distributed to the first unique digital article, or to the first user, or to both, based on the determined eligibility, and wherein the distribution is controlled based on the determined fraction.

2. The system of claim 1, wherein the one or more processors are further configured to:

facilitate entry and/or selection, by the administrative user, of user input, wherein the user input represents a function for adjusting values of the one or more rewards based on the determined fraction.

3. The system of claim 1, wherein the set of unique digital articles have the first user as the common user in control.

4. The system of claim 1, wherein the set of unique digital articles have one or more visual characteristics as in-game user-controllable characters in common, and wherein the set of unique digital articles is owned by more than one different users.

5. The system of claim 4, wherein the size of the set of unique digital articles includes unique digital articles that have been issued and that could be issued in accordance with one or more smart contracts that control issuance of the set of unique digital articles, wherein the one or more smart contracts have been recorded on the private decentralized ledger.

6. The system of claim 1, wherein the private decentralized ledger is configured to record information pertaining to unique digital articles that are associated with in-game user-controllable characters that are configured to be used in the instance of the game, wherein the recorded information includes ownership of the unique digital articles, and wherein the one or more processors are further configured such that at least some of the in-game actions implemented in the instance of the game effectuate modifications to the recorded information pertaining to the unique digital articles.

7. The system of claim 1, wherein individual ones of the set of unique digital articles for which ownership is not recorded on the private decentralized ledger have respective ownerships recorded on one or more public decentralized ledgers, wherein the one or more public decentralized ledgers are part of either EOS.IO mainnet, Ethereum mainnet, Ethereum 1.5, Ethereum 2.0, a derivative of Ethereum 2.0 that is configured to perform transactions of Ether (ETH) between accounts, or a derivative of EOS.IO that is configured to perform transactions of EOS between different accounts.

8. The system of claim 1, wherein the eligibility is determined based on in-game actions by the users, wherein the in-game actions include at least one of:

obtaining distribution rights for a particular unique digital article, participating in an event in the instance of the game, and accomplishing a predetermined milestone in the instance of the game.

9. The system of claim 1, wherein adjustment of the one or more rewards based on the determined fraction is performed such that individual values of the one or more rewards correlate positively with the determined fraction.

10. The system of claim 1, wherein adjustment of the one or more rewards based on the determined fraction is performed based on a function of individual values of the one or more rewards as dependent on the determined fraction, wherein the function is monotonically increasing, and wherein the one or more processors are further configured to notify the first user regarding the adjusted one or more rewards.

11. A method of providing automatic administration based on ledger-specific populations of unique digital articles in an online gaming platform, wherein the unique digital articles are associated with in-game user-controllable characters configured to be used in instances of games within the online gaming platform, wherein the online gaming platform executes an instance of a game to facilitate presentation of the game to users, wherein the presentation of the game is based on views of the game that are determined during execution of the instance of the game, wherein the users include a first user and an administrative user, the method comprising:

managing user accounts associated with the users, wherein the user accounts include account inventories of virtual items, wherein the user accounts include a first user account associated with the first user, wherein the first user account includes a first account inventory of one or more virtual items, wherein the first user controls the one or more virtual items in the first account inventory, wherein the first account inventory includes a first unique digital article that is associated with a first in-game user-controllable character configured to be used in the instance of the game, and wherein the first unique digital article is part of a set of unique digital articles that have either a common user in control, common visual characteristics as in-game user-controllable characters, or both;

determining a size of the set of unique digital articles;

determining a fraction of the set of unique digital articles for which ownership is currently recorded on a private decentralized ledger, wherein the private decentralized ledger is a blockchain;

determining eligibility for the first unique digital article, or the first user, or both to receive one or more rewards;

responsive to determining eligibility, automatically adjusting the one or more rewards based on the determined fraction; and controlling distribution of either the one or more rewards or the adjusted one or more rewards, wherein the distribution is distributed to the first unique digital article, or to the first user, or to both, based on the determined eligibility, and wherein the distribution is controlled based on the determined fraction.

12. The method of claim 11, further comprising:

facilitating entry and/or selection, by the administrative user, of user input, wherein the user input represents a function for adjusting values of the one or more rewards based on the determined fraction.

13. The method of claim 11, wherein the set of unique digital articles have the first user as the common user in control.

14. The method of claim 11, wherein the set of unique digital articles have one or more visual characteristics as in-game user-controllable characters in common, and wherein the set of unique digital articles is owned by more than one different users.

15. The method of claim 14, wherein the size of the set of unique digital articles includes unique digital articles that have been issued and that could be issued in accordance with one or more smart contracts that control issuance of the set of unique digital articles, wherein the one or more smart contracts have been recorded on the private decentralized ledger.

16. The method of claim 11, wherein the private decentralized ledger records information pertaining to unique digital articles that are associated with in-game user-controllable characters that are configured to be used in the instance of the game, wherein the recorded information includes ownership of the unique digital articles, and wherein implementing the in-game actions in the instance of the game includes, for at least some of the in-game actions implemented in the instance of the game, effectuating modifications to the recorded information pertaining to the unique digital articles.

17. The method of claim 11, wherein individual ones of the set of unique digital articles for which ownership is not recorded on the private decentralized ledger have respective ownerships recorded on one or more public decentralized ledgers, wherein the one or more public decentralized ledgers are part of either EOS.IO mainnet, Ethereum mainnet, Ethereum 1.5, Ethereum 2.0, a derivative of Ethereum 2.0 that is configured to perform transactions of Ether (ETH) between accounts, or a derivative of EOS.IO that is configured to perform transactions of EOS between different accounts.

18. The method of claim 11, wherein the eligibility is determined based on in-game actions by the users, wherein the in-game actions include at least one of:
   obtaining distribution rights for a particular unique digital article,
   participating in an event in the instance of the game, and
   accomplishing a predetermined milestone in the instance of the game.

19. The method of claim 11, wherein adjusting the one or more rewards based on the determined fraction is performed such that individual values of the one or more rewards correlate positively with the determined fraction.

20. The method of claim 11, wherein adjusting the one or more rewards based on the determined fraction is performed based on a function of individual values of the one or more rewards as dependent on the determined fraction, wherein the function is monotonically increasing, the method further comprising:
   notifying the first user regarding the adjusted one or more rewards.

* * * * *